United States Patent
Lopez

(10) Patent No.: US 8,189,751 B2
(45) Date of Patent: May 29, 2012

(54) TRACKING TRUNK USAGE IN AN ENTERPRISE NETWORK

(75) Inventor: Claudio Marcelo Lopez, Vuenos Aires (AR)

(73) Assignee: Service Bureau Intetel S.A., Buenos Aires ( * ) Notice: Subject to any disclaimer, the term of this patent is extended or adjusted under 35 U.S.C. 154(b) by 1130 days.

(21) Appl. No.: 12/036,623

(22) Filed: Feb. 25, 2008

(65) Prior Publication Data

US 2008/0205612 A1    Aug. 28, 2008

Related U.S. Application Data

(60) Provisional application No. 60/891,686, filed on Feb. 26, 2007.

(51) Int. Cl.
*H04M 15/00* (2006.01)
*G01R 31/00* (2006.01)
*G06F 11/00* (2006.01)
*G06Q 10/00* (2006.01)

(52) U.S. Cl. ............... 379/114.01; 370/216; 370/229; 370/238; 370/252; 370/395.5; 455/414.1; 705/7.13; 709/203; 709/217; 714/4.3; 714/48; 714/57

(58) Field of Classification Search .................. 370/229, 370/238, 252, 352, 395.5, 216; 379/114.01, 379/114.02, 115.01, 221.01, 37, 45; 455/414.1; 705/7.13; 709/203, 217; 714/4.3, 48, 57
See application file for complete search history.

(56) References Cited

U.S. PATENT DOCUMENTS

| | | | |
|---|---|---|---|
| 4,727,577 A * | 2/1988 | Frey et al. ............... 379/115.01 |
| 5,185,697 A * | 2/1993 | Jacobs et al. .................... 379/45 |
| 5,553,124 A * | 9/1996 | Brinskele ................ 379/114.02 |
| 6,170,067 B1 * | 1/2001 | Liu et al. ........................ 714/48 |
| 6,516,424 B2 * | 2/2003 | Satomi et al. .................. 714/4.3 |
| 6,600,722 B1 * | 7/2003 | Tran et al. ..................... 370/238 |
| 6,738,931 B1 * | 5/2004 | Osborn et al. .................. 714/37 |
| 7,050,555 B2 * | 5/2006 | Zargham et al. ......... 379/115.01 |
| 7,254,606 B2 * | 8/2007 | Hamada ........................ 709/203 |
| 7,283,484 B1 * | 10/2007 | Choudhury et al. .......... 370/252 |
| 7,310,341 B2 * | 12/2007 | Prager et al. ............... 370/395.5 |
| 7,366,104 B1 * | 4/2008 | Choudhury et al. .......... 370/252 |
| 7,596,608 B2 * | 9/2009 | Alexander et al. ............ 709/217 |
| 8,023,621 B2 * | 9/2011 | Hulls .............................. 379/37 |
| 8,045,453 B2 * | 10/2011 | Asghar et al. ................ 370/229 |
| 2004/0043759 A1 * | 3/2004 | McGovern et al. ......... 455/414.1 |
| 2005/0041642 A1 * | 2/2005 | Robinson ...................... 370/352 |
| 2008/0198998 A1 * | 8/2008 | Aleynikov ............... 379/221.01 |
| 2008/0205612 A1 * | 8/2008 | Lopez ...................... 379/114.01 |
| 2008/0205613 A1 * | 8/2008 | Lopez ...................... 379/114.02 |

* cited by examiner

*Primary Examiner* — Gerald Gauthier
(74) *Attorney, Agent, or Firm* — Fish & Richardson P.C.

(57) ABSTRACT

The present disclosure is directed to a system and method for tracking trunk usage in an enterprise network. In some implementations, a method for identifying trunk expenses includes aggregating data identifying telecommunication services associated with a plurality of trunks in an enterprise network. Charges for the used telecommunication services are identified. The charges are associated with a carrier that provided the telecommunication services. Carrier charges for each of the plurality of the trunks are automatically identified based, at least in part, on the aggregated data and the carrier charges.

21 Claims, 3 Drawing Sheets

TRACKING TRUNK USAGE IN AN ENTERPRISE NETWORK

CLAIM OF PRIORITY

This application claims priority under 35 USC §119(e) to U.S. Patent Application Ser. No. 60/891,686, filed on Feb. 26, 2007, the entire contents of which are hereby incorporated by reference.

TECHNICAL FIELD

This invention relates to telecommunication services and systems.

BACKGROUND

Communication networks include wired and wireless networks. Examples wired networks include the Public Switched Telephone Network (PSTN) and the Internet. Examples of wireless networks include cellular networks as well as unlicensed wireless networks that connect to wired networks. Calls and other communications may be connected across wired and wireless networks.

SUMMARY

The present disclosure is directed to a system and method for tracking trunk usage in an enterprise network. In some implementations, a method for identifying trunk expenses includes aggregating data identifying telecommunication services associated with a plurality of trunks in an enterprise network. Charges for the used telecommunication services are identified. The charges are associated with a carrier that provided the telecommunication services. Carrier charges for each of the plurality of the trunks are automatically identified based, at least in part, on the aggregated data and the carrier charges.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
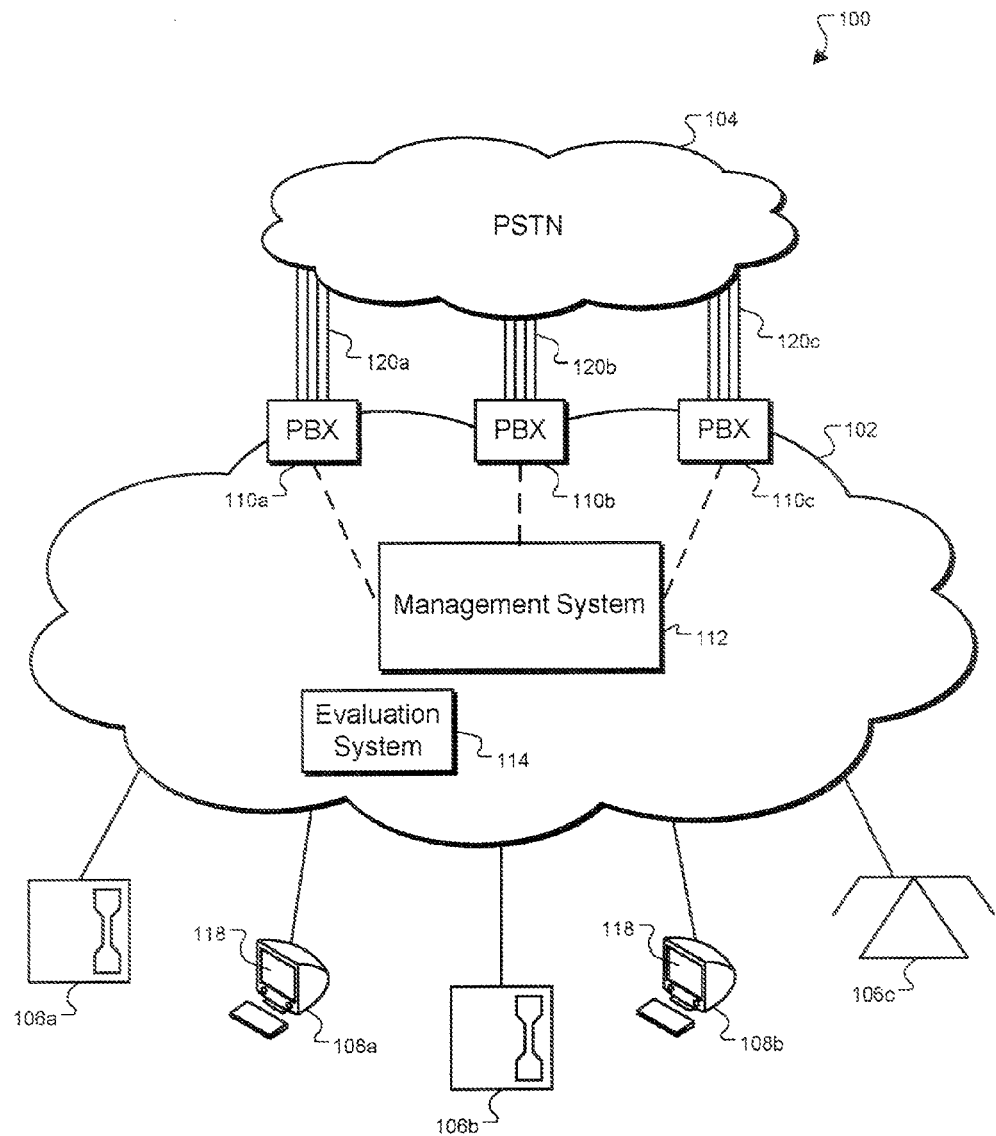
FIG. 1 is a block diagram illustrating an example communication system.

FIG. 1 is an example communication system 100 for automatically tracking trunk usage in an enterprise network in accordance with some implementations of the present disclosure. For example, the system 100 may automatically map, correlate or otherwise associate Private Branch eXchanges (PBX) trunks in an enterprise network with a carrier catalog. In some implementations, the carrier catalog can be a list of the trunks that a carrier provides to an enterprise. The catalog may be generated based, at least in part, on the information included in invoices. In this and/or other examples, the system 100 may automatically verify telecommunication expenses for each PBX trunk as well as usage for each PBX trunk. In general, the system 100 may automatically execute one or more of the following: identify call information for PBX trunks in an enterprise network, identify invoices from one or more carriers, associate PBX trunks to carrier catalogs using the call information and the invoices, verify expenses for the PBX trunks, and/or identify usage of the PBX trunks. In some implementations, the system 100 automatically identifies trunks in a telecommunication expense system. In doing so, the system 100 may automatically generate consolidated reports of trunk expenses in an enterprise that includes multiple trunks (e.g., thousands) distributed across multiple PBXs (e.g., hundreds) with different carriers and contract agreements. In some implementations, the system 100 may provide one or more of the following: managing trunk rates independent of human interaction, i.e., automatically; assigning (e.g., automatically) trunks (trunk catalog vs. PBX trunk channel) in a telecommunication expense program; automatically verifying agreements and actual applied rates; and/or automatically identifying trunk-activity.

At a high level, the system 100 can, in some implementations, include an enterprise network 102 and a public switched telephone network (PSTN) 104. The enterprise network 102 is a network associated with an enterprise. The enterprise may comprise a corporate or business entity, a government body, a non-profit institution, or any other organization with a plurality of telecommunication assets 106, clients 108, PBXs 110a-c, a management system 112 and an evaluation system 114. The enterprise may be the owner of at least some of the assets 106, clients 108, the PBXs 110a-c, a management system 112 and/or the evaluation system 114. Of course, the enterprise may also lease one or more of the assets 106, clients 108, the PBXs 110a-c, a management system 112 and/or the evaluation system 114 or may hire contractors or agents who are responsible for maintaining, configuring, controlling, and/or managing the assets 106, clients 108, the PBXs 110a-c, a management system 112 and/or the evaluation system 114. In some implementations, the enterprise manages the telecommunications services accessed by the assets 106 through the enterprise network 102. For example, the enterprise may distribute commands preventing accesses to one or more telecommunication services by one or more assets 106 associated with the enterprise network 102. In the illustrated implementation, enterprise network 102 facilitates wireless and/or wireline communication between assets 106, the clients 108, and other enterprise elements. The enterprise network 102 may communicate, for example, Internet Protocol (IP) packets, Frame Relay frames, Asynchronous Transfer Mode (ATM) cells, voice, video, data, and other suitable information between network addresses. In addition, while enterprise network 102 is illustrated as a single network, the enterprise network 102 may comprise a plurality of networks. Also, the enterprise network 102 may comprise different types of networks compatible with different protocols without departing from the scope of this disclosure.

The assets 106 comprise electronic devices operable to receive and transmit network communications within the enterprise network 102. As used in this disclosure, communication assets 106 are intended to encompass cellular phones, data phones, pagers, portable and stationary computers, smart phones, personal data assistants (PDAs), one or more processors within these or other devices, or any other suitable electronic or processing devices capable of communicating information over a wireless or wired link to the enterprise network 102. Generally, the assets 106 may transmit voice, video, multimedia, text, web content or any other user/client-specific content. In short, asset 106 generates requests, responses or otherwise communicates with other assets 106 and/or PSTN 104 through the enterprise network 102. For purposes of example, the assets 106 may include: a computer device, SIP telephone device, plain old telephone device, a digital phone, a soft phone, and/or other suitable telecommunication devices.

The clients 108a-b are any devices (e.g., computing devices) operable to connect or communicate with at least the evaluation system 114. Typically, a client 108 includes, executes, or otherwise presents a Graphical User Interface (GUI) 118 and comprises an electronic device operable to receive, transmit, process and store any appropriate data associated with the system 100. While the illustrated implementation includes the clients 108a-b, the enterprise network 102 may include any number of clients 108 communicably coupled to the evaluation system 114. The client 108 is intended to encompass a personal computer, touch screen terminal, workstation, network computer, kiosk, wireless data port, smart phone, personal data assistant (PDA), cellular phone, one or more processors within these or other devices, or any other suitable processing or electronic device used by a user viewing content from the evaluation system 114, such as reports of usage of PBX trunks. For example, client 108 may be a PDA operable to wirelessly connect with an external or unsecured network. In another example, the client 108 may comprise a laptop that includes an input device, such as a keypad, touch screen, mouse, or other device that can accept information, and an output device that conveys information associated with telecommunication services used by the enterprise network 102. Both the input device and output device may include fixed or removable storage media such as a magnetic computer disk, CD-ROM, or other suitable media to both receive input from and provide output to users of clients 108 through the display, namely the client portion of GUI 118.

GUI 118 comprises a graphical user interface operable to allow the user of client 108 to interface with at least a portion of system 100 for any suitable purpose, such as viewing trunk usage reports. Generally, GUI 118 provides the particular user with an efficient and user-friendly presentation of data provided by or communicated within system 100. GUI 118 may comprise a plurality of customizable frames or views having interactive fields, pull-down lists, and buttons operated by the user. For example, GUI 118 is operable to display certain reports in a user-friendly form based on, for example, department and/or individual use of PBX trunks. As previously mentioned, the system 100 may collect call accounting records generated by PBXs 110a-c and transmit them to the evaluation system 114, which can, in some implementations, allocate the records and calculate costs in accordance with contracts signed between the enterprise and carriers. The GUI 118 may present such reports in one or more formats to enable, for example, employees to control their use of telecommunication services. In some implementations, managers can see his/her own reports and a departmental report, with all employees belonging to his/her cost center. In the case of violations, the GUI may present alarms or other notifications to indicate deviations from enterprise policies. GUI 118 can be configurable, supporting a combination of tables and graphs (bar, line, pie, status dials, etc.). The term graphical user interface may be used in the singular or in the plural to describe one or more graphical user interfaces and each of the displays of a particular graphical user interface. GUI 118 can be any graphical user interface, such as a generic web browser or touch screen, that processes information in system 100 and efficiently presents the results to the user. The evaluation engine 220 can accept data from the client 108 via a web browser (e.g., Microsoft Internet Explorer or Netscape Navigator) and return the appropriate HTML or XML responses to the browser using the enterprise network 102.

The PBXs 110a-c can include any software, hardware, and/or firmware configured to switch communication sessions between telecommunication assets 106 and/or PSTN 104. For example, the PBX 110 may represent a plurality of assets 106 to PSTN 104, which may reduce the number of trunks 120 to the PSTN 104. The trunks 120 comprise media for maintaining a call session between assets 106 in the enterprise network 102 and the PSTN 104. Each trunk 120 may be associated with a single asset 106 or multiple assets 106 may be associated with a single trunk 120. In addition to routing calls outside the enterprise, the PBX 110 can, in some implementations, switch call sessions between assets 106 in the enterprise network 102 independent of the PSTN 104. In some implementations, the PBX 110 transmits, to the management system 112, information identifying or otherwise associated with telecommunication services used by the assets 106. For example, the PBX 110 may transmit, to the management system 112, one or more of the following: destination number, carrier, call duration, service type, date, time, originating extension, and/or trunk used.

The management system 112 can include any software, hardware, and/or firmware configured to track information associated with telecommunication services used in the enterprise network 102. For example, the management system 112 may receive information associated with used services and transmit such information to the evaluation system 114 for evaluating. In some implementations, the management system 112 may execute one or more of the following methods: receive information associated with telecommunication services (e.g., call detail records) routed through PBX 110, translate received information to one or more different protocols compatible with the evaluation system 114, and transmit commands to PBXs 110a-c in accordance with information received from the evaluation system 114. In some implementations, the management system 112 may access the PBXs 110 using different interfaces such as, for example, serial, TCP/IP socket, file transfer, and others. In some implementations, the management system 112 periodically transmits information to the evaluation system 114. For example, the management system 112 may store records in local files and transmit the records once a day. In some implementations, the management system 112 may transmit information to the evaluation system 114 in response to an event such as, for example, a request from a user.

The evaluation system 114 can include any software, hardware, and/or firmware configured to evaluate truck usage and/or expenses. For example, the evaluation system 114 may determine costs associated with each trunk of a PBX and verify whether the charged services are in accordance with carrier agreements. In some implementations, the evaluation system 114 may execute one or more of the following methods: receive information identifying telecommunication services associated with the trunks 120, identify pricing policies for using services provided through the trunks 120, determine cost associated with the used services in accordance with the pricing policies, identify carrier charges or invoices for using carrier catalogs, determine the charges applied to the trunks 120 based, at least in part, on the carrier invoices and trunk information received from the PBXs 110, and/or transmit commands to the PBXs 110a-c in response to, for example, a request from a user. In regards to the received information, the evaluation system 114 can, in some implementations, generate or update files associated with the received information. For example, the evaluation system 114 may receive information associated with PBX trunks and update files associated with the PBX trunks using the received information. In some implementations, the evaluation system 114 may receive invoices and/or information associated with carrier charges and generate and/or update files associated with the carrier.

In regards to evaluating information associated with PBX trunks, the evaluation system 114 can, in some implementations, determine costs associated with the PBX trunks based, at least in part, on carrier charges, and/or other parameters. For example, the evaluation system 114 may automatically map, correlated or otherwise associate certain carrier charges to specific trunks 120. In this case, the evaluation system 114 may associate service usage identified in the carrier invoices with service usage identified by a particular PBX 110. In doing so, the evaluation system 114 may assign carrier charges to specific trunks 120 of the particular PBX 110.

In verifying trunk costs, the evaluation system 114 can, in some implementations, determine anticipated costs using trunk information received from the PBXs and associated carrier agreements. In some implementations, the evaluation 114 can receive pricing agreements for the trunks 120 that provided by the associated carriers to verify certain charges. For example, the evaluation system 114 may identify logical and/or mathematical expressions for determining anticipated costs of using trunks 120 based on the carrier agreements associated with the PBX 110. In some implementations, the evaluation engine 220 automatically compares the anticipated costs for using the trunks 120 and the carrier charges for the trunks 120. This comparison may be executed in light of pricing agreements previously received by the associated carriers. In response to determining discrepancies, the evaluation system 114 may transmit a notification indicating the discrepancies. In addition or alternatively, the evaluation system 114 may transmit a command, to the PBX 110 through the management system 112, terminating access to one or more telecommunication services in response to at least the determined violations. For example, the evaluation system 114 may transmit a command blocking a PIN and/or extension associated with an individual. Based at least on the determined costs and/or verifications, the evaluation system 114 may generate reports associated with the trunk usage.

The PSTN network 104 is used for communicating, for example, via telephone land lines. In one implementation, the PSTN network 104 is of the form of a circuit-switched telephone network which may be used for land line voice calls, digital subscriber line (DSL) internet access, and/or dial-up modem internet access. A set of access tandem and end office switches segment the network into sections which are considered to be within a local calling distance. For example, communications relayed through the PSTN network 104 can be sent from a local user via an end office switch, through a series of access tandem switches, and through the remote end office switch to a remote user. In transmitting signals, PSTN 104 may use one or more of the following: telephones, key telephone systems, private branch exchange trunks 120, and certain data arrangements. Since PSTN 104 may be a collection of different telephone networks, portions of PSTN 104 may use different transmission media and/or compression techniques. Completion of a circuit in PSTN 104 between a call originator and a call receiver may require network signaling in the form of either dial pulses or multi-frequency tones.

In one aspect of operation, the assets 106 consume services using trunks 120, which is tracked by the PBXs 110. The PBXs 110 transmit the trunk information to the management system 112. In some implementations, the management system 112 converts received information to a form compatible with the evaluation system 114. The management system 112 transmits the trunk information to the evaluation system 114. In response to an event (e.g., request, receipt of a carrier invoice), the evaluation engine 220 identifies carrier invoices and determines charges for the trunks 120. In some implementations, the evaluation system 114 also determines anticipated charges for the trunks 120 using the trunk information collected by the PBXs 110 and carrier agreements. These carrier agreements may be previously received from carriers associated with the trunks 120. The evaluation engine 220 may compare the anticipated charges to the carrier charges to determine whether these charges match. In response to at least a discrepancy, the evaluation engine 220 can, in some implementations, generate a notification indicating the discrepancies. In some implementations, the evaluation engine 220 can generate reports based, at least in part, on the carrier charges, anticipated charges, usage, and/or discrepancies.

Figure 2:
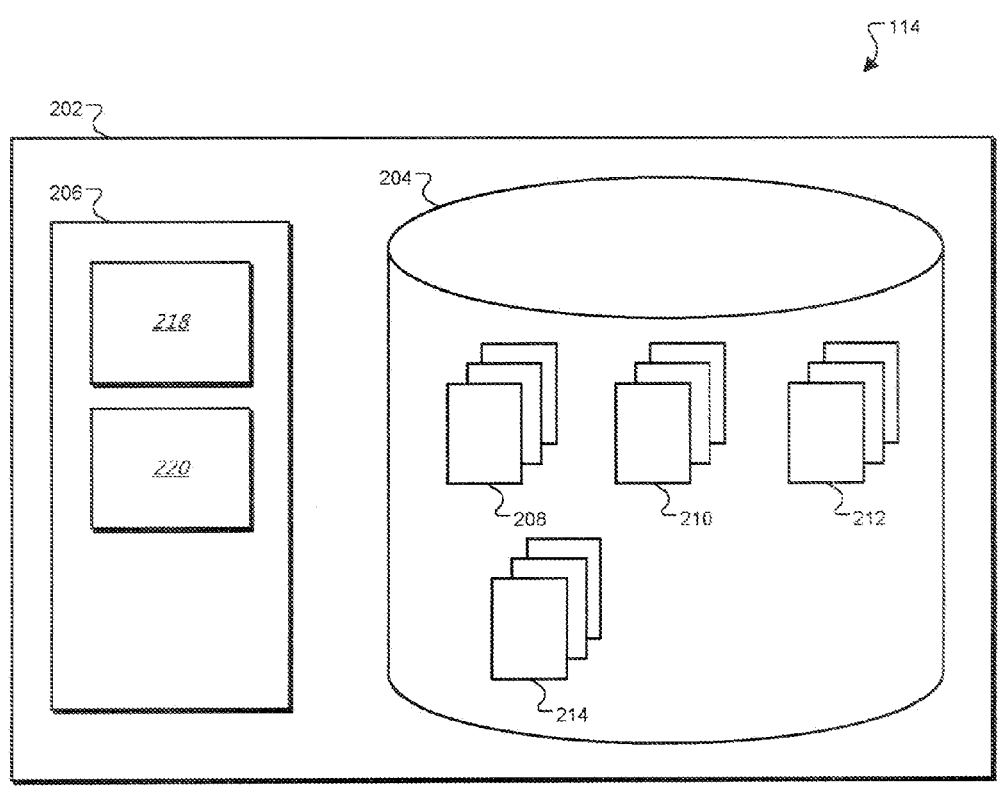
FIG. 2 is an example evaluation system of FIG. 1.

FIG. 2 is an example evaluation system 114 for evaluating trunk usage in the enterprise network 102 of FIG. 1. In the example shown, the evaluation system 114 comprises a single evaluation server 202 in the enterprise network 102, though other configurations are possible. In the illustrated implementation, the evaluation server 116 comprises an electronic computing device operable to receive, transmit, process and store data associated with the system 100. The system 100 can be implemented using computers other than servers, as well as a server pool. Indeed, the evaluation server 202 may be any computer, electronic or processing device such as, for example, a blade server, general-purpose personal computer (PC), Macintosh, workstation, Unix-based computer, or any other suitable device. In other words, the system 100 may include computers other than general purpose computers as well as computers without conventional operating systems. The evaluation server 202 may be adapted to execute any operating system including Linux, UNIX, Windows Server, or any other suitable operating system.

In the illustrated implementation, the evaluation server 202 includes memory 204 and a processor 206. The memory 204 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 204 includes trunk profiles 208, invoice files 210, evaluation criteria 212, and reports 214. The memory 204 can, in some implementations, include other data without departing from the scope of this disclosure. The trunk profiles 208 can include one or more entries or data structures that identify telecommunication services used, available, and/or otherwise associated with the trunks 120. For example, the trunk profiles 208 may include or otherwise identify telecommunication services used (e.g., type) and associated trunk used. In some implementations, the trunk profiles 208 may include one or more of the following: service type, amount consumed (e.g., time, data amount), destination, carrier, date, time, originating PIN, originating extension, PBX 110, destination, call type (e.g., personal, work related), and/or trunk used. For example, the invoice file 210 may include or at least be based on information received from the PBX 110 through the management system 112. In some implementations, the trunk profiles 208 include aggregated data associated with one or more parameters. For example, the trunk profiles 208 may include aggregated usage data for a specific trunk 120 for each associated service type.

The invoice files 210 can include one or more entries or data structures that identify carrier charges used, available, and/or otherwise associated with carrier catalogs. For example, the invoice files 210 may include or otherwise identify telecommunication services used and associated charges determined by a carrier. In some implementations, the invoice files 210 may include one or more of the following: service type, amount consumed (e.g., time, data amount), destination, carrier, date, time, carrier catalog, originating extension, PBX 110, destination, and/or other information. For example, the invoice files 210 may include or at least be based on information a carrier uses to determine charges for used services. In some implementations, the invoice file 210 can include aggregated data associated with one or more parameters. For example, the invoice file 210 may include aggregated charges for a carrier catalog.

Evaluation criteria 212 include any parameters, variables, algorithms, instructions, rules, objects and/or other directives for determining anticipated charges for telecommunication services associated with trunks 120. For example, the evaluation criteria 212 may include or otherwise identify directives for determining costs associated with service usage for each trunk 120. In some implementations, the evaluation criteria 212 can identify one or more expressions (e.g., mathematical, logical) for determining costs for services associated with trunks 120. Such expressions may be based on one or more parameters such as time, duration, rates associated with service providers, data amount, associated service contract, number dialed, type of call, and/or other parameters detailed in service agreements with carriers. In some implementations, the evaluation criteria 212 may be associated with a service provider, a service agreement, a PBX 110, and/or other aspects.

Based, at least in part on trunk profiles 208, invoice files 210 and/or the evaluation criteria 212, the reports 214 include one or more entries or data structures that identify information associated with one or more trunks 120. For example, the reports 214 may identify a specific trunk 120, carrier charges, anticipated charges, and/or discrepancies between the two charges. The reports 214 may be based or otherwise associated with one or more criteria. For example, the reports 214 may be associated with one or more of the following criteria: one or more trunks, PBX, carrier, service agreement, one or more discrepancies, and/or other suitable aspects associated with trunk usage. In some implementations, the reports 214 includes aggregated charges associated with each trunk 120. In addition, the reports 214 may include information identifying actions that a user of the client 108 may perform in response to the displayed information. For example, the reports 214 may enable the system or an administrator to terminate a trunk in the event that usage is below a threshold.

Processor 206 executes instructions and manipulates data to perform operations of the evaluation server 202. Although FIG. 1 illustrates a single processor 206 in server 202, multiple processors 206 may be used according to particular needs, and reference to processor 206 is meant to include multiple processors 206 where applicable. In the illustrated implementation, processor 206 executes a tracking engine 218 and an evaluation engine 220 at any appropriate time such as, for example, in response to a request or input from a user of the server 202 or any appropriate system coupled with the network 102. The tracking engine 218 includes any software, hardware, and/or firmware, or combination thereof, operable to track trunk usage. For example, the tracking engine 218 may periodically or in response to another event transmit requests to the management system 112 for information associated with trunks 120. In response to at least receiving information, the tracking engine 218 can, in some implementations, generate or update trunk profiles 208 based, at least in part, on the received trunk information.

The evaluation engine 220 includes any software, hardware, and/or firmware, or combination thereof, operable to evaluate charges associated with trunks 120. In evaluating services usage, the evaluation engine 220 may map, correlate or otherwise associate charges included or otherwise identified in invoice files 210 with trunks 120. For example, the evaluation engine 220 may compare service usage identified in invoice files 210 with service usage identified in trunk profiles 208. In response to a least a match, the evaluation engine 220 may associate carrier charges to specific trunks 120. In addition, the evaluation engine 220 can, in some implementations, determine anticipated charges using trunk usage and carrier agreements. For example, the evaluation engine 220 may identify services used by a specific trunk 120 and evaluation criteria 212 that defines criteria for determining charges in accordance with a carrier agreement. Using the identified trunk usage and the carrier criteria, the evaluation engine 220 can, in some implementations, determine charges that the enterprise anticipates from the associated carrier. In some implementations, the evaluation engine 220 compares the anticipated charges and the invoices charges for the trunks 120 to verify that the two charges match. In response to the charges not matching or otherwise determining a discrepancy, the evaluation engine 220 can generate a notification of the identified discrepancy.

In one aspect of operation, the tracking engine 218 receives information identifying service usage associated with the trunks 120. In some implementations, the tracking engine 218 transmits a request for trunk information in response to at least any suitable event (e.g., expiration of time, request). The tracking engine 218 identifies one or more trunk profiles 208 associated with the trunk 120 and updates the trunk profiles 208 based, at least in part, on the received trunk information. In connection with receiving the trunk information, the tracking engine 218 receives information identifying charges for services used from a carrier. For example, the tracking 218 may receive one or more invoices associated with a carrier. The tracking engine 218 generates or updates invoice files 210 based, at least in part, on the invoice information. In response to a suitable event, the evaluation engine 220 determines the trunks 120 associated with the charges. For example, the evaluation engine 220 may determine that the trunk 120 is associated with each charge. In some implementations, the evaluation engine 220 determines the associated trunks based, at least in part, on the service usage determined by the management system 112 and the carrier. After determining the association in this implementation, the evaluation engine 220 associates the carrier charges to the identified trunk 120. In connection with determining the carrier charges associated with the trunks, the evaluation engine 220 identifies evaluation criteria 212 associated with the trunk 120. Using the service usage identified by the PBX, the evaluation engine 220 can, in some implementations, determining anticipated charges for the trunk 120 based, at least in part, on the evaluation criteria 212 and one or more trunk profiles 208. In some implementations, the evaluation engine 220 verifies the carrier charges based, at least in part, on the anticipated charges. For example, the evaluation engine 220 may compare the carrier charges and the anticipated charges for a specific trunk 120. The evaluation engine 220 may generate one or more reports 214 based, a least in part, on carrier charges for a trunk 120, anticipated charges for the trunk 120, verification of the carrier charges, and/or other information.

Figure 3:
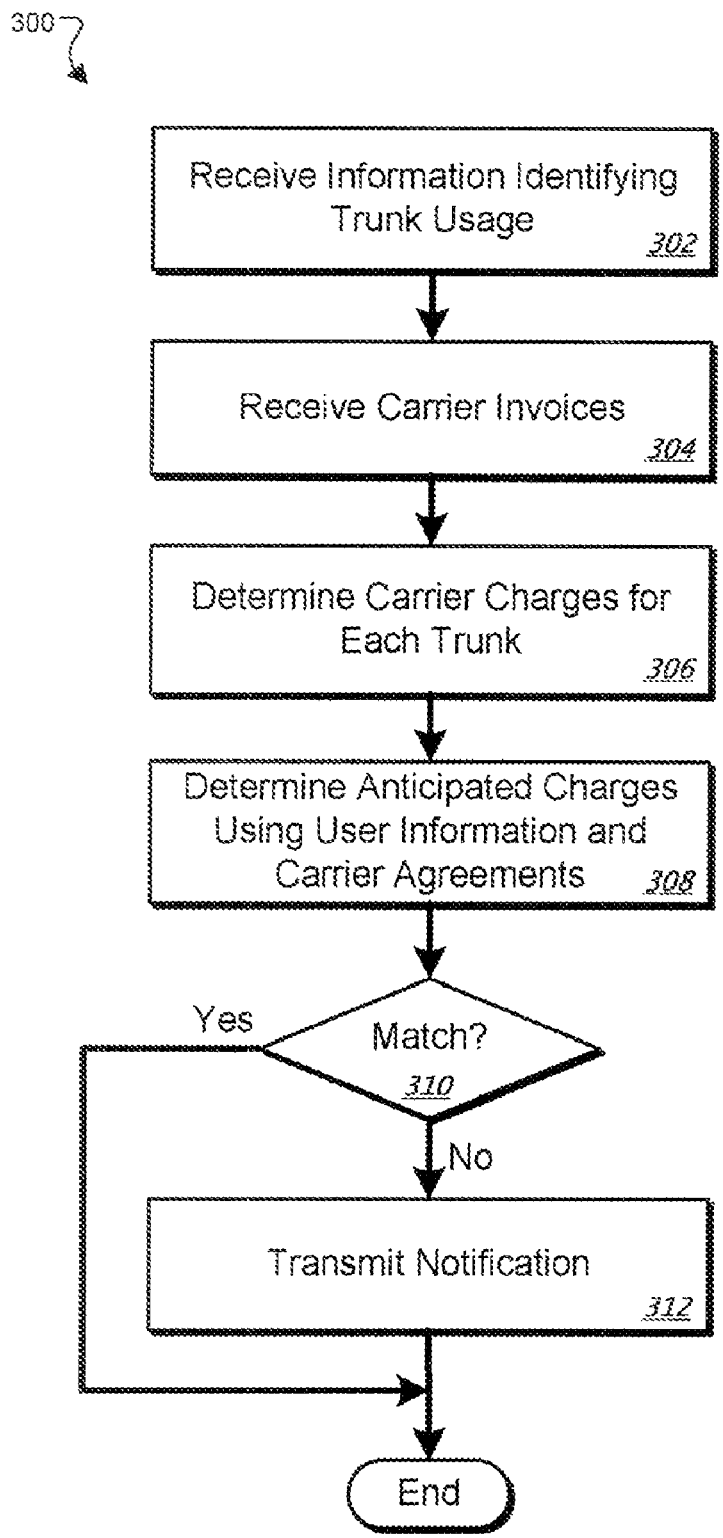
FIG. 3 is a flow chart illustrating an example method for automatically identifying trunks in a telecommunication expense system.

FIG. 3 is a flowchart illustrating an example method 300 for managing carrier charges for trunks in an enterprise network in accordance with some implementations of the present disclosure. Generally, the method 300 describes receiving information associated with used services associated with a trunk and verifying the carrier charges for the trunk. The method 300 contemplates using any appropriate combination and arrangement of logical elements implementing some or all of the described functionality.

Method 300 begins at step 302 where information identifying telecommunication services associated with trunks in an enterprise network is received. For example, the management system 112 may transmit, to the evaluation system 114, information identifying services associated with each of the trunks 120. At step 305, carrier invoices are received identifying charges for telecommunication services used by the enterprise network. In the example, the evaluation system 114 may receive carrier invoices and generate one or more invoice files 210 based, at least in part, on the carrier invoices. Next, at step 306, carrier charges are determined for each of the trunks in the enterprise network. Returning to the example, the evaluation system 114 may identify carrier charges for each trunk by mapping service usage identified in the trunk profiles 208 with service usage identified in the invoice files 210. Anticipated charges for the services associated with each trunk is determined using, for example, trunk-usage information and carrier agreements at step 308. In some implementations, the carrier agreements are received prior to usage and/or verification of trunk charges. Again in the example, the evaluation system 114 may anticipate charges in the carrier invoice using trunk profiles 208 and evaluation criteria 212. If the anticipated charges do not match the carrier charges for the trunks at decisional step 310, then at step 312, a notification of the discrepancy is transmitted to the enterprise. In the example, the evaluation system 114 may transmit a notification to the user. If the anticipated charges match the carrier charges for the trunks at decisional step 310, then execution ends.

A number of implementations of the invention have been described. Nevertheless, it will be understood that various modifications may be made without departing from the spirit and scope of the invention.

What is claimed is:

1. A method comprising:
aggregating data identifying different telecommunication services from different carriers associated with a plurality of trunks in an enterprise network, wherein the aggregated data includes enterprise-determined services used by each of the plurality of trunks as determined by the enterprise;
identifying carrier charges for telecommunication services from each of the different carriers, wherein carrier invoices identify the carrier charges;
automatically mapping the carrier charges to the enterprise-determined services to determine carrier charges for each of the plurality of the trunks; and
storing the carrier charges for each of the plurality of the trunks.

2. The method of claim 1, wherein the carrier charges includes services used as determined by the carrier, wherein automatically mapping the carrier charges comprises:
automatically comparing services used as determined by the enterprise and the services used as determined by the carrier; and
automatically determining the carrier charges associated with each of the plurality of trunks in accordance with the comparison.

3. The method of claim 2, further comprising:
automatically mapping each of the plurality of trunks to a trunk channel identified in carrier charges; and
wherein the carrier charges for each of the plurality of trunks is based, at least in part, on the channel mapping.

4. The method of claim 1, further comprising:
identifying criteria for determining charges anticipated by the enterprise for the telecommunication services associated each of the plurality of trunks, wherein the criteria is based, at least in part, on a service agreement between the enterprise and the carrier;
automatically determining the anticipated charges for each of the plurality of trunks based, at least in part, on the aggregated data and the evaluation criteria; and
automatically verifying that the anticipated charges and the carrier charges for each of the plurality of trunks match.

5. The method of claim 4, further comprising automatically generating a notification of one or more discrepancies in response to at least the anticipated charges not matching the carrier charges for at least one of the plurality of trunks.

6. The method of claim 4, wherein the criteria comprises one or more rates for using a telecommunication service.

7. The method of claim 1, wherein the aggregated data includes calls made, duration, and trunk used.

8. The method of claim 1, further comprising automatically identifying at least one of the plurality of trunks which has a service-usage below certain usage threshold.

9. A system for identifying trunk expenses, comprising:
memory configured to store information associated with charges for telecommunication usage; and
one or more processors configured to:
aggregate data identifying different telecommunication services from different carriers associated with a plurality of trunks in an enterprise network, wherein the aggregated data includes enterprise-determined services used by each of the plurality of trunks as determined by the enterprise;
identify carrier charges for telecommunication services from each of the different carriers, wherein carrier invoices identify the carrier charges;
automatically map the carrier charges to the enterprise-determined services to determine carrier charges for each of the plurality of the trunks.

10. The system of claim 9, wherein the carrier charges includes services used as determined by the carrier, wherein the processors configured to automatically map the carrier charges comprises the processors configured to:
automatically compare services used as determined by the enterprise and the services used as determined by the carrier; and
automatically determine the carrier charges associated with each of the plurality of trunks in accordance with the comparison.

11. The system of claim 10, further configured to:
automatically map each of the plurality of trunks to a trunk channel identified in carrier charges; and
wherein the carrier charges for each of the plurality of trunks is based, at least in part, on the channel mapping.

12. The system of claim 9, further configured to:
identify criteria for determining charges anticipated by the enterprise for the telecommunication services associated with each of the plurality of trunks, wherein the criteria is based, at least in part, on a service agreement between the enterprise and the carrier;

automatically determine the anticipated charges for each of the plurality of trunks based, at least in part, on the aggregated data and the evaluation criteria; and automatically verify that the anticipated charges and the carrier charges for each of the plurality of trunks match.

13. The system of claim 12, further configured to automatically generate a notification of one or more discrepancies in response to at least the anticipated charges not matching the carrier charges for at least one of the plurality of trunks.

14. The system of claim 12, wherein the criteria comprises one or more rates for using a telecommunication service.

15. The system of claim 9, wherein the aggregated data includes calls made, duration, and trunks used.

16. The system of claim 9, further configured to automatically identify at least one of the plurality of trunks which has a service-usage below certain usage threshold.

17. A computer program product encoded on a tangible, non-transitory storage medium, the product comprising computer readable instructions operable to:

aggregate data identifying different telecommunication services from different carriers associated with a plurality of trunks in an enterprise network, wherein the aggregated data includes enterprise-determined services used by each of the plurality of trunks as determined by the enterprise;

identify carrier charges for telecommunication services from each of the different carriers, wherein carrier invoices identify the carrier charges;

automatically map the carrier charges to the enterprise-determined services to determine carrier charges for each of the plurality of the trunks.

18. The computer program product of claim 17, wherein the carrier charges includes services used as determined by the carrier, wherein the computer program product operable to automatically map the carrier charges comprises the computer program product operable to:

automatically compare services used as determined by the enterprise and the services used as determined by the carrier; and automatically determine the carrier charges associated with each of the plurality of trunks in accordance with the comparison.

19. The computer program product of claim 18, further operable to:

automatically map each of the plurality of trunks to a trunk channel identified in carrier charges; and wherein the carrier charges for each of the plurality of trunks is based, at least in part, on the channel mapping.

20. The computer program product of claim 17, further operable to:

identify criteria for determining charges anticipated by the enterprise for the telecommunication services associated each of the plurality of trunks, wherein the criteria is based, at least in part, on a service agreement between the enterprise and the carrier;

automatically determine the anticipated charges for each of the plurality of trunks based, at least in part, on the aggregated data and the evaluation criteria; and automatically verify that the anticipated charges and the carrier charges for each of the plurality of trunks match.

21. A system comprising:

a means for aggregating data identifying different telecommunication services from different carriers associated with a plurality of trunks in an enterprise network, wherein the aggregated data includes enterprise-determined services used by each of the plurality of trunks as determined by the enterprise;

a means for identifying carrier charges telecommunication services from each of the different carriers, wherein carrier invoices identify the carrier charges;

a means for automatically mapping the carrier charges to the enterprise-determined services to determine carrier charges for each of the plurality of the trunks; and a means for storing the carrier charges for each of the plurality of the trunks.

\* \* \* \* \*

UNITED STATES PATENT AND TRADEMARK OFFICE
CERTIFICATE OF CORRECTION

| | |
|---|---|
| PATENT NO. | : 8,189,751 B2 |
| APPLICATION NO. | : 12/036623 |
| DATED | : May 29, 2012 |
| INVENTOR(S) | : Claudio Lopez Silva |

Page 1 of 1

It is certified that error appears in the above-identified patent and that said Letters Patent is hereby corrected as shown below:

Title Page, Column 1, line 1 (Inventor), Delete "Vuenos" and insert -- Buenos --, therefor.

Column 12, line 29, Claim 21, after "charges" insert -- for --.

Signed and Sealed this
Fourteenth Day of August, 2012

David J. Kappos
*Director of the United States Patent and Trademark Office*